Oct. 13, 1942.  R. D. SMITH  2,298,656
WHEEL BALANCE TESTER
Filed Dec. 1, 1939  3 Sheets—Sheet 1

Inventor
Roy D. Smith
By Merrill M. Blackburn
Attorney

Oct. 13, 1942.    R. D. SMITH    2,298,656
WHEEL BALANCE TESTER
Filed Dec. 1, 1939    3 Sheets-Sheet 2

Inventor
Roy D. Smith
By Merrill M. Blackburn
Attorney

Oct. 13, 1942.  R. D. SMITH  2,298,656
WHEEL BALANCE TESTER
Filed Dec. 1, 1939   3 Sheets—Sheet 3

Inventor
Roy D. Smith
By Merrill M. Blackburn
Attorney

Patented Oct. 13, 1942

2,298,656

UNITED STATES PATENT OFFICE 2,298,656

WHEEL BALANCE TESTER

Roy D. Smith, Davenport, Iowa, assignor to Bee Line Manufacturing Company, Scott County, Iowa, a corporation of Iowa Application December 1, 1939, Serial No. 307,043

10 Claims. (Cl. 73—53)

The present invention relates to the art of balancing, either statically or dynamically or both, articles which are substantially balanced about at least one axis. This invention has particular application to the balancing of vehicle wheels, including the tires, to the balancing of brake drums and to the balancing of combined wheels and brake drums.

Among the objects of the present invention are the provision of an improved apparatus for determining the balance or unbalance of a member intended to rotate about a fixed axis; the provision of an improved apparatus for checking static balance of wheels; the provision of improved apparatus for checking dynamic balance of wheels; the provision of a machine for the purpose indicated which will be more accurate than any other machine now on the market; the provision of a machine for the use indicated which, in operation, will be independent of accurate leveling of the machine base; and such further objects, advantages, and capabilities as will hereafter appear and as are inherent in the structure disclosed herein. My invention further resides in the combination, construction, and arrangement of parts illustrated in the accompanying drawings and, while I have shown therein a preferred embodiment of this invention, I desire the same to be understood as illustrative only and not as limiting my invention.

Dynamic off-balance of automobile wheels causes a vibration to be set up which is one of the main contributing causes of the commonly termed "shimmy." It results in a tendency of the apparent geometrical axis to deviate from the axis of rotation. In use on an automobile, due to king-pin structure, this deviation will be damped out every 180°. As is to be expected, in operation, the maximum deviation ordinarily either does not reach or else it exceeds the deviation which would be found if damping did not take place. Regardless of this defect in giving a proper indication of the magnitude of off-balance, it is customary practice in balance testing machines now on the market to incorporate a construction analogous to the king-pin of an automobile. Thus a false reading is obtained and adjustments made, which, though corresponding to the test results, do not correct the defects in the wheel tested.

It is accordingly a further object of this invention to provide a balance tester in which the wheel is allowed freely to deviate in all directions and in which the deviation is not damped out.

In accordance with the present invention, a balance tester is provided with which both accurate static and dynamic balancing may be effected, such balancing being independent of leveling of the testing machine. More particularly a machine is provided having a self-aligning bearing, in combination with means for mounting a wheel on said bearing whereby the wheel may tilt in any direction about said bearing, means for rotating a wheel so mounted about a fixed axis of rotation through said bearing independently of the dynamic balance of the wheel, said means for mounting a wheel subsequently supporting said wheel for rotation and tilting in any direction responsive to the dynamic balance of the wheel, and means for determining the deviation of the apparent geometrical axis of the wheel when rotating responsive to the dynamic balance from the fixed axis about which the wheel first rotates. Further, in accordance with this invention, a machine is provided with a self-aligning bearing, in combination with means for mounting a wheel on a portion of said bearing with the wheel generally horizontal and whereby the wheel may tilt in any direction about said bearing, and means to support and rotate another portion of said bearing.

According to the present disclosure, a testing method is provided which comprises the steps of supporting a wheel for rotation and for tilting in any direction, rotating the wheel about a fixed axis independently of the dynamic balance of the wheel, subsequently allowing the wheel to tilt about such axis responsive to the dynamic unbalance of the wheel, and determining the deviation, from said fixed axis, of the position of the geometrical axis of said wheel, assumed during rotation, when in dynamic equilibrium.

Thus, among the primary advantages of this invention is the fact that dynamic off-balance testing is performed on dynamic equilibrium conditions rather than dynamic flux conditions.

In the drawings annexed hereto and forming a part hereof,

Figures 1, 2:
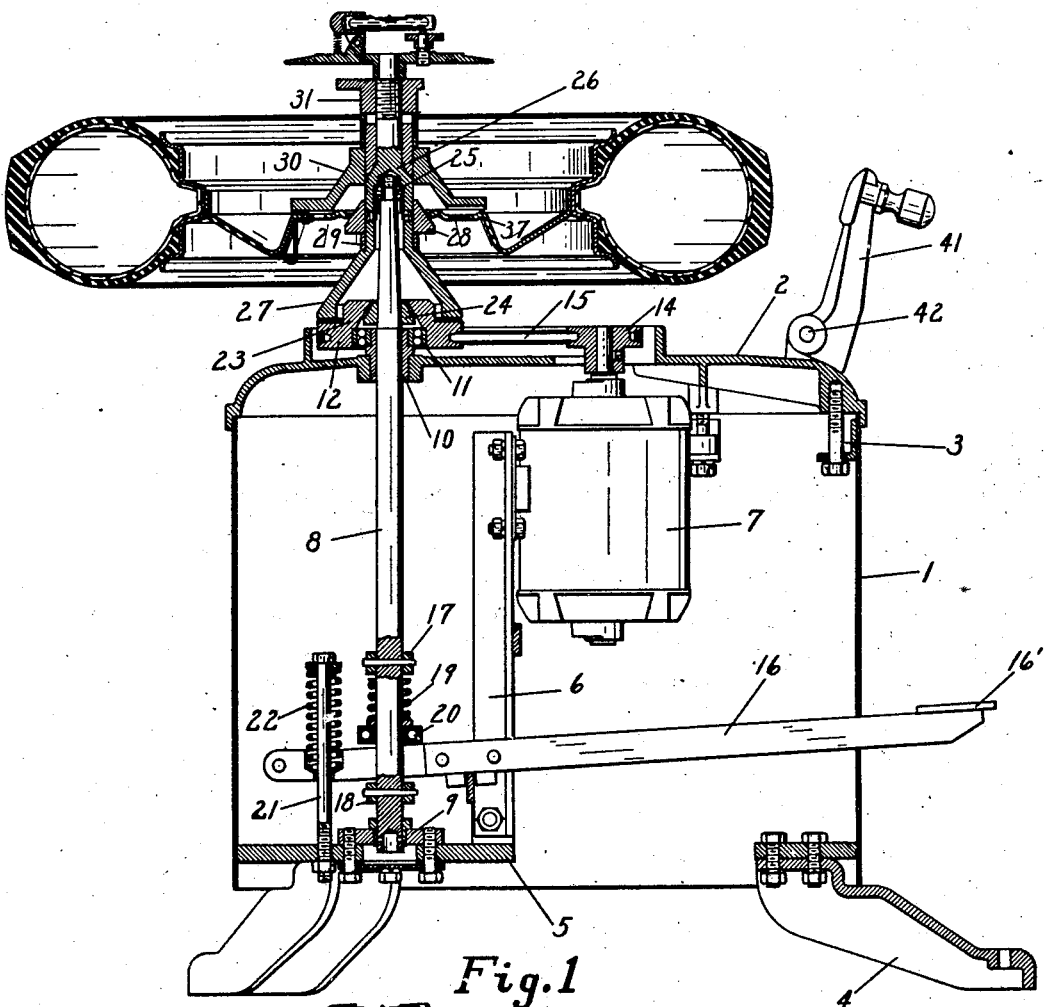
Fig. 1 represents a substantially central vertical section through an apparatus embodying my invention and having a wheel mounted thereon to be tested, the wheel being shown in transverse section.
Fig. 2 represents a fragmentary portion of the structure shown in Fig. 1, the wheel being shown in a position indicating out of balance.
Figure 3:
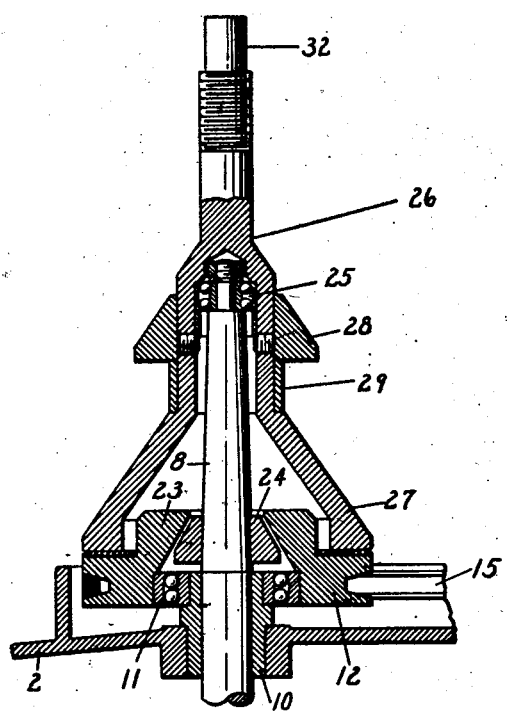
Fig. 3 represents a portion of the structure shown in Fig. 1 on a somewhat enlarged scale, with the clamp engaged as in Fig. 1.
Figure 4:
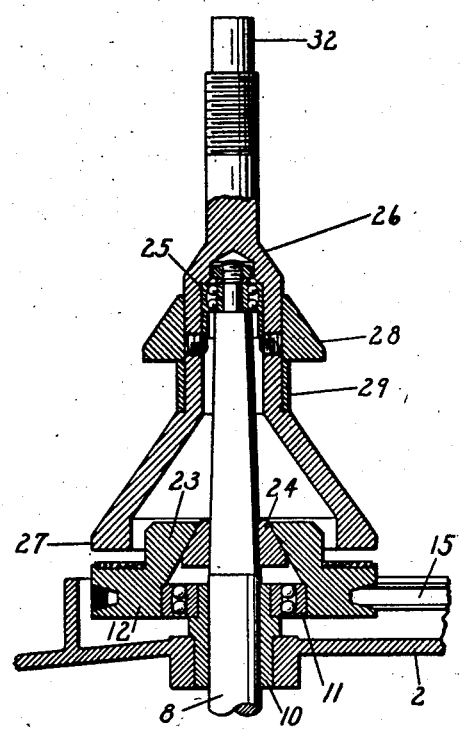
Fig. 4 represents the same structure as Fig. 3 with the clamp disengaged.
Figure 5:
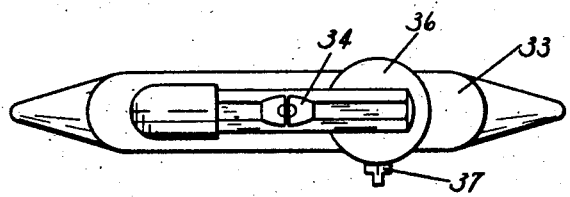
Fig. 5 represents a plan view and Fig. 6 an elevation of an inclination measuring mechanism.
Figure 6:
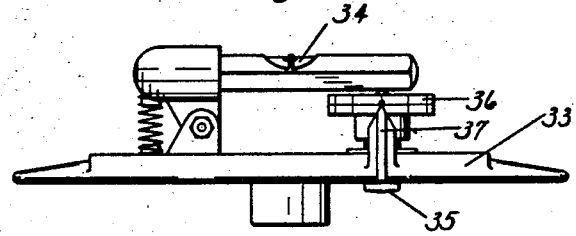

Reference will now be made in greater detail to the annexed drawings for a more complete description of this invention. In the form of the device shown in Figs. 1 to 7 of the accompanying drawings, a body is provided comprising a wall member 1, a top member 2 covering the upper end of the wall member 1 and which is bolted thereto as by bolts 3, and legs 4 are provided, secured to the lower end of the wall member 1. In the lower portion of the body member, a plate 5 is secured to the wall member 1. A frame 6 rises from the plate 5 substantially centrally of the body of the machine and has secured to the upper end thereof a motor 7 with the shaft in substantially vertical position. A shaft 8 is slidably mounted in a vertical position in the top 2 and in a plate 9 adjustably secured to the plate 5. In the top 2, the bearing carrying the shaft 8 is a bushing 10 having an outwardly extending flange immediately above the top 2 and an upwardly extending flange thereabove on which is secured a self-aligning bearing. A pulley 12 secured to the bearing 11 is driven by the motor 7 through a pulley 14 secured to the motor shaft and a belt 15 drivingly engages the pulleys 12 and 14.

In order to move the shaft 8 vertically, a lever 16 is provided, pivotally mounted on the frame 6, having its inner end bifurcated to extend on opposite sides of the shaft 8, and having at its outer end a treadle 16' whereby an operator may manually control the position of the lever and parts controlled thereby. A pair of collars 17, 18 is provided, with the collar 17 located above the lever 16 and collar 18 located below the lever. A spring 19 is located between the collar 17 and the lever to the left of the pivot, as seen in Fig. 1, to take gradually the thrust of the lever when the treadle is depressed by the operator. An antifriction bearing 20 is interposed between the lever 16 and the spring 19 to allow free rotation of the shaft. In order to hold the treadle in elevated position, as shown in Fig. 1, a bolt 21 threadedly engages in an opening in the plate 5, being locked in adjusted position therein by means of a nut at its lower extremity. A spring 22 is interposed between the lever 16 and the head of the bolt, normally elevating the treadle. If it is desired to place more pressure upon this end of the lever 16, the bolt is adjusted through the plate 5 and secured in adjusted position by means of this nut. If less pressure is desired, the adjustment is made in the opposite direction. For holding the treadle in depressed position with the shaft 8 raised, a shoulder is provided adjacent the lever 16 in the body member 1 under which the lever may be moved and from which it may be released by lateral movement.

A cylindrical flange 23 is provided upon the upper face of the pulley 12, the inner face of which is conical, increasing in size downwardly. When the pulley 12 is in a position perpendicular to the shaft 8, the axis of the conical face is coincident with the axis of the shaft. A ring 24 is secured on the shaft 8 above the bearing 11 and within the flange 23, the outer face of the ring being conical and complemental to the conical face of the flange 23. The ring 24 and the flange 23 are so proportioned as to allow vertical movement of the shaft 8, for engaging and disengaging the ring and flange. Accordingly, the flange and ring cooperate, the two being a conical clutch whereby, when the shaft 8 is raised by depressing the treadle 16', the clutch is engaged, and whereby the shaft 8 is driven by the pulley 12. Further, it should be noted that, in case the pulley is out of position perpendicular to the shaft, engagement of the clutch will align the pulley into such position.

The shaft 8 extends above the ring 24 and is provided with a second self-aligning bearing secured to its upper end. A fixture 26 is provided having a cylindrical opening in the lower end thereof in which the outer ring of bearing 25 is secured by conventional means, such as, the ring and set screws shown. The cylindrical opening in the fixture is sufficiently large to allow substantial tilting of the fixture with respect to the shaft 8. This fixture is provided with means for clamping a wheel thereto in position with the central portion of the wheel perpendicular to the axis of the fixture, with one of a pair of cooperating clamping means for holding the fixture in any particular tilted position with respect to the shaft, and with means for measuring the degree and direction of tilt of the fixture with respect to the shaft.

The fixture 26 has formed integral therewith a downwardly and outwardly directed flange 27, which, being movable vertically with the shaft 8, is movable into and out of engagement with the pulley 12 exteriorly of the flange 23. Sufficient clearance is provided between the inside of the conical flange 27 on fixture 26 and the flange 23 on pulley 12 that the flange 27 and pulley 12 may clamp together with both the fixture and pulley tilted with respect to the shaft. A clutch facing of any suitable material may be provided upon either of the cooperating clamp means, that is, on the pulley 12 or on the flange 27. It should be noted that it is unnecessary for the end of the flange 27 to be perpendicular to the axis of the fixture, as will be obvious from the description of operation hereinafter, and that it is immaterial in operation if foreign matter lodges on the lower end of the flange 27.

The fixture 26 is provided with a frustoconical ring 28 which is slidable onto the fixture, a collar 29 being provided to space the ring from flange 27. Collars of various widths may be provided to allow adjustment of the position of the ring along the length of the fixture, whereby a wheel held thereby, regardless of the shape of any specific wheel to be tested, may be properly secured to the fixture. The frustoconical ring 28 is of a size to extend only partially through the central openings of the automobile wheels in common usage. A bearing plate 30 is provided which is slidable upon the fixture. The lower face of the plate 30 should be substantially perpendicular to the axis of the fixture when the plate is in position thereon so as to hold the central portion of a wheel clamped between ring 28 and plate 30 perpendicular to the axis of the fixture.

The upper end of the fixture is formed as a spindle which is threaded to provide for tightening the plate 30 against the wheel by a nut 31 threadedly engaging the spindle of the fixture and bearing against the plate.

A stud 32, which is cylindrical and coaxial with the axis of the fixture, is fixed to the upper end of the fixture above the threaded portion. An inclinometer is pivotally mounted upon the stud, which inclinometer involves a bar 33 pivoted upon the stud to rotate upon the axis of the fixture. To the upper surface of the bar 33, a level 34 is pivoted at one end thereof, a spring being provided to tilt the other end of the level toward the bar. A measuring screw 35 engages in an opening in the bar 33 below the free end of the level. This screw 35 is provided with a calibrated disc 36 cooperating with a pointer 37 carried by the bar 33. In the position of the screw 35 in which the zero calibration on disc 36 registers with the pointer 37, the level is perpendicular to the axis of the fixture. When the screw is raised by turning, the level is tilted with respect to the axis of the fixture, the amount of tilt being indicated by the calibration.

Of the two types of off-balance, it is generally best to test for and correct static off-balance first, though on the machine of the present invention, one may, if desired, test first for the dynamic type.

Figure 8:
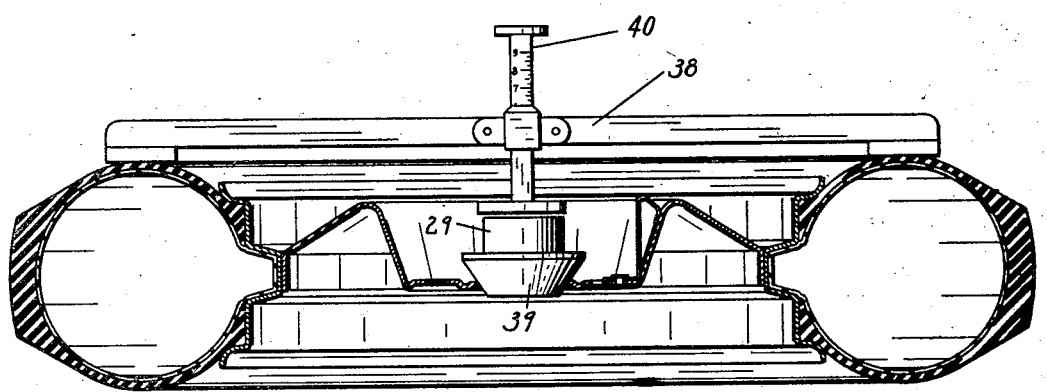
Fig. 8 shows a measuring device applied to a wheel to determine the required length of a collar to be used for securing the proper positioning of the center plane of the wheel.

For either test, it is desirable to mount the wheel or other device to be tested with the center of gravity thereof at or just below the center of the self-aligning bearing 25. For this purpose, the structure shown in Fig. 8 is useful. This structure involves a bar 38 to be placed in engagement with the tire on the outer side of the wheel, and with the bar intersecting the axis of the wheel. A conical member 39 is positioned in the central opening, which member may be either the ring 28 from the balance testing machine or an auxiliary testing member. A rod 40 is slidably mounted at the center of the bar 38 and is mounted for sliding movement transversely thereof. This rod 40 is calibrated to read directly tire width and, in testing position, the rod is set at the calibration corresponding to the tire width. A ring 29 is selected which fits closely between rod 40 and the member 39. The bar 40 is of such a length that when this ring 29 is placed in the machine below cone 28, the tire gauged will have its center of gravity properly located.

Having then tested, as above described, for the size of collar 29 to be placed on the fixture 26, and with the proper collar in position and the ring 28 adjacent thereto, the wheel is placed upon the ring with the inner side of the wheel up. This positioning is preferable in that it is then handy for placing balancing weights on the inner side of the wheel. It should, however, be understood that the use of this method is not necessary to the use of this testing machine, since some other type of weights may be used, such as those which clamp to the rim of both sides of the wheel.

The plate 30 is next placed in position and secured by the nut 31 so that the central disc of the wheel is perpendicular to the fixture. With the wheel then in position as described, and the treadle 16' lowered, the motor 7 is started. Through pulley 14 and belt 15, the pulley 12 is driven. As the shaft 8 is elevated, due to treadle 16' being lowered, the clutch to the shaft 8, which comprises flange 23 and ring 24, is engaged and the cooperating clamp means comprising pulley 12 and flange 27 is disengaged. It will therefore be seen that the wheel is, in its position, not driven but is free to rotate and to tilt on the self-aligning bearing 25, in response to any static off-balance. As the shaft 8 drives the internal portion of bearing 25, the support of the wheel in the bearing is substantially the equivalent of a support absolutely without friction, and far superior to the same bearing for support but without a driven support for the bearing. The heavy radial portion of the wheel will of course tilt the wheel, this portion being the lowest portion in the tilted position. A suitable weight may then be added to balance the wheel statically.

From the above description of static balancing operations it will be obvious that vertical positioning of the shaft 8 is unnecessary, the only necessity being that it be nearly enough vertical to allow tilting of wheel in any direction.

Figure 7:
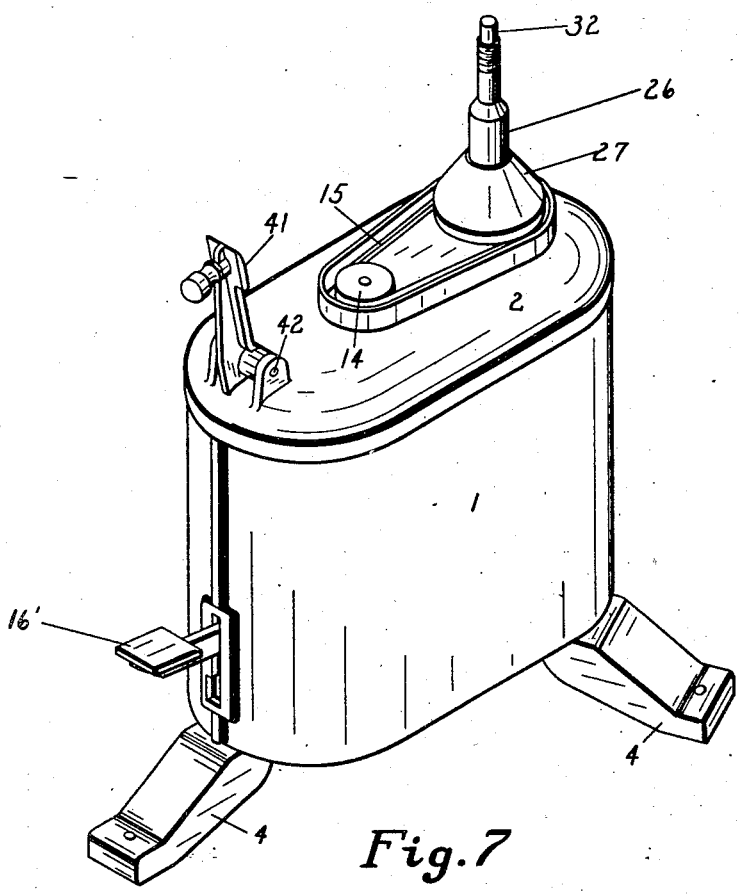
Fig. 7 is a perspective view of the apparatus without a wheel in place.

With the wheel still supported on the fixture, as heretofore stated, the dynamic balance testing is performed. First the treadle 16' is unlatched from the shoulder on the member 1, as shown in Fig. 7. This allows the shaft 8 to move to lowered position whereby the conical clutch driving the shaft 8 is disengaged and the second clamp means, namely, the pulley 12 and flange 27, is engaged. This clamp means at this time acts as a clutch to transmit power from the pulley to the fixture and thereby rotate the wheel. Regardless of whether the clamp means clamps the fixture coaxial with the shaft 8, the wheel rotates on an axis through the self-aligning bearings 11 and 25. After the wheel has come up to speed, the treadle 16' is depressed to an intermediate position in which both the conical clutch and the clamp means are disengaged. Free then to tilt responsive to gyroscopic tendencies of the wheel, the wheel and fixture will then tilt so that the dynamic axis of rotation is in alignment with the axis of rotation, i. e., in alignment with the bearings 11 and 25. If the wheel is dynamically off-balance, the apparent geometrical axis of the wheel will then be out of line with the axis of rotation and will be travelling in a cone. The treadle 16' is then released to elevated position again engaging the clamping means and the power is shut off. The wheel may be stopped by means of a hand brake 41 pivotally carried at 42 by the top 2.

When the wheel is rotating freely, as described above, and the apparent geometrical axis is travelling in a cone, the same side of the wheel and therefore of the flange 27 is always in the lowermost position. Thus, the radial speed of rotation of the geometrical axis about the cone is equal to the radial speed of rotation of the wheel. When the flange 27 is lowered into engagement with the pulley 12, the pulley will tilt about its self-aligning bearing 11 responsive to the tilt of the wheel and clamp the wheel in its tilted position with respect to the axis of rotation. The direction of tilt of the wheel indicates the direction of dynamic off-balance and the degree of tilt the amount of dynamic off-balance.

The inclinometer which may have been theretofore placed upon the stud 32 or may be placed there now is used to indicate both the degree and direction of dynamic off-balance. After rotation of the article being tested has been stopped, if the central plane of the wheel is not perpendicular to axis 8, a test is made to determine the direction and amount of tilt. This is accomplished as follows: The inclinometer is or may be held stationary and the article being tested turned to determine the position at which the bubble in the level moves farthest to one end of its tube. Of course, the article may be held stationary and the level turned about its pivot 32, and the same result accomplished. Having now determined this position of greatest deviation, the disc 36 is turned until the level bubble is brought to certain position at the middle of the tube. The reading on the disc 36, at the point of pointer 37, is now noted. Next, the wheel is turned one hundred eighty degrees (180°), the level being held stationary. Again the disc 36 is turned enough to level up the level and note is made of the number of divisions on the disc 36 which pass the pointer 37. The number of these necessary to bring the level back to a level condition is noted. This is a direct reading of the amount of weight required to be applied to the wheel to overcome its dynamic unbalance. The disc 36 may be graduated in any units of weight desired, as, for example, ounces or grams. If the shaft 8 is known to be vertical, the second leveling of the level is unnecessary, as the reading on the disc 36 indicates the degree of off-balance, the calibration preferably being in ounces of weight at the edge of the rim. If it is not known that the shaft 8 is vertical, the wheel may be rotated 180° and the measurement repeated, as described above.

In this specification and in the subjoined claims, I denote by the term "wheel" not only the wheel proper or a wheel and tire assembly, whether or not the hub and/or brake drum is attached thereto but also such other devices which are intended to be balanced about an axis and rotated at high speed during use, such as airplane propellers.

Having now described my invention, I claim:

1. A testing machine for determining off-balance of a wheel comprising a pair of self-aligning bearings, means to support said bearings, means carried by one of said bearings to support a wheel with said one of said bearings located generally centrally of the wheel, means to rotate the wheel about the axial line of said bearings as the axis of rotation of the wheel, the last mentioned means comprising in part a pulley surrounding the axial line of said bearings and supported by one thereof, said drive pulley being pivotally mounted with reference to said axial line, and cooperating clamp means, one of which is carried by the wheel supporting means, and the other of which is supported by the other of said bearings, said clamp means being movable into cooperating clamping engagement.

2. A testing machine for determining off-balance of a wheel comprising a pair of self-aligning bearings, means to support said bearings, means carried by one of said bearings to support a wheel with said one of said bearings located generally centrally of the wheel, means to rotate the wheel about the axial line of said bearings as the axis of rotation of the wheel, cooperating clamp means, one of which is carried by the wheel supporting means, and the other of which is supported by the other of said bearings, said clamp means being movable into cooperating clamping engagement, and means for holding said clamping means disengaged and for then engaging said clamping means when the wheel is rotating in dynamic equilibrium about the axis through said bearings.

3. A testing machine for determining dynamic off-balance of a wheel comprising a support to which a wheel may be attached, said support having a self-aligning bearing positioned, when the wheel is secured to the support, substantially on the axis of the wheel, cooperating clamp means, one of which is carried by said support, and a second self-aligning bearing, in general alignment with the first mentioned bearing, and supporting the other of said clamp means, said clamp means being relatively movable together into cooperating engagement, each of the two clamp means being tiltable relatively to the common axis of the self-aligning bearings.

4. A machine for testing the balance of a wheel comprising a shaft, a pair of self-aligning bearings, in one of which the shaft is slidable and the other of which is fixed to the shaft, a fixture carried by one of said bearings to which a wheel may be centrally secured, said fixture being tiltable with reference to said shaft so that the axes of the two make a small angle with relation to each other, cooperating clamp means, one of which is supported by the bearing other than that supporting the fixture, and the other of said clamping means remaining fixed with respect to said fixture in any tilted position of the fixture with respect to said shaft, when the two clamping means are in clamping engagement, and means for determining the amount to which said fixture is tilted with respect to said shaft.

5. In a machine for determining wheel unbalance, a generally vertically extending shaft, means for supporting said shaft in a generally vertical position, a self-aligning bearing on said shaft to support a wheel for rotation about said shaft, means to connect a wheel to said bearing, means to rotate said last named means to cause rotation of a wheel mounted thereon, the second and third means being capable of relative tilting, one with respect to the other, and clamping means for clamping the two together in any relatively tilted position assumed by them.

6. In a machine for determining wheel unbalance, a generally vertically extending shaft, means for supporting said shaft in a generally vertical position, a self-aligning bearing on said shaft to support a wheel for rotation about said shaft, means to connect a wheel to said bearing, means to rotate said last named means to cause rotation of a wheel mounted thereon, and means for holding the wheel in any inclined position assumed by it during rotation.

7. In a wheel balance tester, a shaft having adjacent an end thereof a self-aligning bearing, a wheel-supporting structure surrounding said bearing and connecting a vehicle wheel thereto, means to lift the bearing and thereby the wheel so that the wheel may assume a tilted position of stable equilibrium during rotation, and means to hold said wheel in such tilted position.

8. In a wheel balance tester, a shaft having adjacent an end thereof a self-aligning bearing, a wheel-supporting structure surrounding said bearing and connecting a vehicle wheel thereto, means to lift the bearing and thereby the wheel so that the wheel may assume a tilted position of stable equilibrium during rotation, means to hold said wheel in such tilted position, and means for imparting rapid rotation to the wheel-supporting structure.

9. In a wheel balance tester, a shaft having adjacent an end thereof a self-aligning bearing, a wheel-supporting structure surrounding said bearing and connecting a vehicle wheel thereto, means to lift the bearing and thereby the wheel so that the wheel may assume a tilted position of stable equilibrium during rotation, means to hold said wheel in such tilted position, means for imparting rapid rotation to the wheel-supporting structure, and means for determining the amount of weight necessary to overcome the unbalance of the wheel and thereby dynamically balance the wheel when that amount of weight is applied to the indicated part of the wheel.

10. In a wheel balance tester, supporting means, an axle supported thereby, a lever connected to said axle for moving it longitudinally, a self-aligning bearing adjacent one end of said axle, a second self-aligning bearing, located between the first bearing and the supporting means, a clutch part having a sleeve engaging the movable part of the first self-aligning bearing and moving therewith, a driven pulley cooperating with the first mentioned clutch part and carried by the movable part of the second mentioned self-aligning bearing, said pulley carrying a second clutch part, and means for mounting a wheel on said sleeve and securing it in place thereon with the geometrical axis of the wheel passing approximately through the center of oscillation of the first mentioned self-aligning bearing whereby the wheel is free to assume an inclined position during rotation, the pulley being capable of oscillating into positions other than at a right angle to the axle and of having its geometrical axis parallel to that of the wheel, said clutch parts, when brought together, holding the wheel against change of its condition of inclination.

ROY D. SMITH.